No. 814,453. PATENTED MAR. 6, 1906.
H. KERN.
COMPASSES.
APPLICATION FILED MAR. 18, 1905.
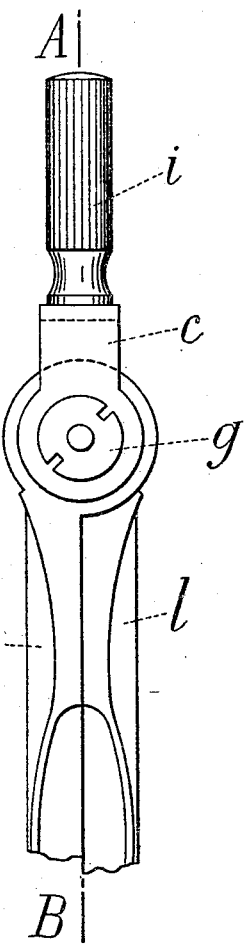
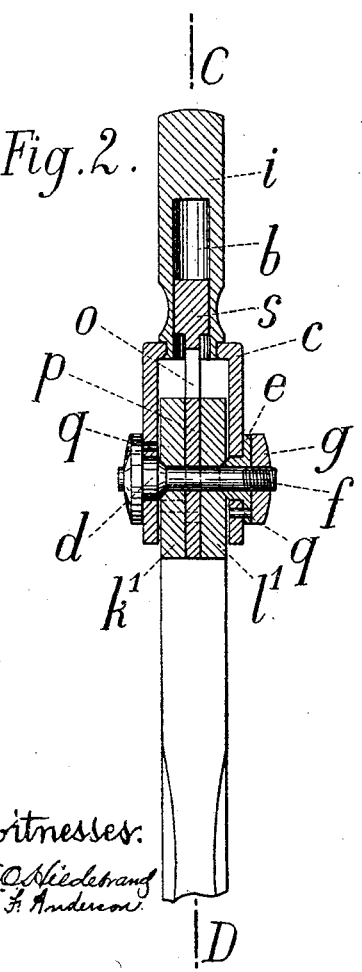
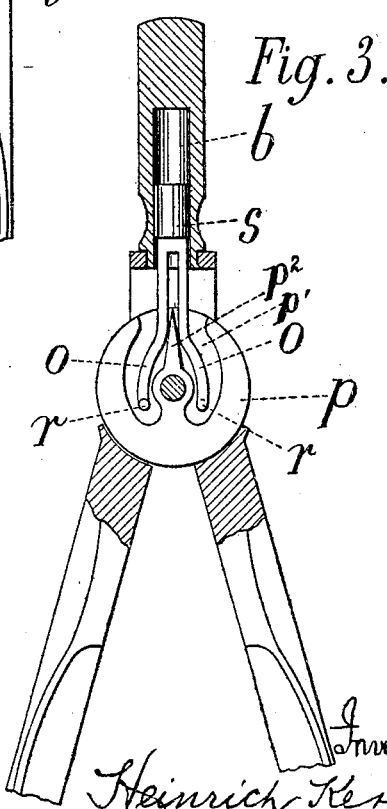

UNITED STATES PATENT OFFICE.

HEINRICH KERN, OF AARAU, SWITZERLAND.

COMPASSES.

No. 814,453.  Specification of Letters Patent.  Patented March 6, 1906.

Application filed March 18, 1905. Serial No. 250,837.

*To all whom it may concern:*

Be it known that I, HEINRICH KERN, a citizen of Switzerland, residing at Aarau, Switzerland, have invented certain new and useful Improvements in Compasses; and I do hereby declare the following to be a full, clear, and exact description of the invention, such as will enable others skilled in the art to which it appertains to make and use the same.

This invention relates to compasses and similar instruments—such as dividers, calipers, and the like—and has for its object the provision of means whereby in use the stem-handle of the instrument is constantly maintained in a vertical position relative to the working surface of a drawing, for instance, irrespective of the degree of separation of the legs, the angle between the handle and both legs being equal.

Other advantages attend the peculiarities of construction herein set forth, as will be more fully hereinafter described.

In the accompanying drawings, in which similar reference-letters indicate corresponding parts throughout, I have illustrated my invention as applied to an ordinary type of compasses.

In the drawings, Figure 1 is a plan view. Fig. 2 is a partial vertical section on the line A B of Fig. 1, and Fig. 3 is a similar section on the line C D of Fig. 2.

As will be seen from the drawings, the head-plates $k'$ and $l'$ of the two legs $k$ and $l$ are provided on opposite sides with conical recesses, one fitted to receive the conical shouldered pivot $d$ and the other a similar pivot $e$. The pivot $d$ is secured in fixed relation to one end of a bolt $f$. The other end of this bolt passes loosely through the pivot $e$ and is threaded to receive the lock-nut $g$.

The handle $i$ is provided with a yoke $c$, lying on either side of the head-plates $k'$ and $l'$, and provided with openings in which the pivots $d$ and $e$ are journaled. Pins $q$ pass through each wing of the yoke $c$ and its pivot, thus securing the pivots against rotary movement relative to the yoke and handle and preventing any loosening of the lock-nut $g$ by friction in use, while permitting axial adjustment to tighten the bearing.

A plate or disk $p$ is mounted on the bolt $f$ between the two head-plates $k'$ and $l'$, which is provided with two curved slots $p'$ and an intermediate radial spur $p^2$. The lower portion of the handle $i$ is bored or hollowed out axially at $b$ to receive the stem $s$ of a forked spring, the arms $o$ of which lie on each side of the spur $p^2$ in the slots $p'$ of the plate or disk $p$. The extremity of each arm $o$ is provided with a lug $r$, the two lugs projecting laterally from the arms in opposite directions and engaging corresponding apertures in the head-plates $k'$ and $l'$.

It will be seen that as one of the legs $k$ or $l$ is bent at an angle to the handle $i$ upon the bolt $f$ its engagement with the lug $r$ will cause the upward displacement of the stem $s$ in the handle $i$, and the upward movement of the stem carries with it the other lug $r$, causing the other leg $k$ or $l$ to describe the same arc about the bolt $f$ as the first leg. As a result the legs $k$ and $l$ always occupy equal angular positions relative to the handle $i$, and the handle $i$ always occupies a position perpendicular to the work surface in use.

Having thus fully described my invention, what I claim as new, and desire to secure by Letters Patent of the United States, is—

1. In a mathematical instrument, the combination, with the two head-plates and a clamping device therefor, of a handle connected with the clamping device and provided with an axial bore, a forked piece longitudinally displaceable in the bore, and having the extremities of its prongs turned in opposite directions laterally to engage recesses in the head-plates.

2. In a mathematical instrument, the combination, with the two head-plates, a slotted plate arranged between the head-plates, and a clamping device therefor, of a handle connected with the clamping device and provided with an axial bore, a forked piece longitudinally displaceable in the bore with its prongs lying in the slots, and a connection between the ends of the prongs and the head-plates.

3. In a mathematical instrument, the combination, with the two head-plates, a slotted plate arranged between the head-plates, a yoke embracing the plates, and a clamping device passing through the yoke and plates, of a handle connected with the yoke and provided with an axial bore, a forked piece longitudinally displaceable in the bore with its prongs lying in the slots, and a connection between the end of each of the prongs and one of the head-plates.

4. In a mathematical instrument, the combination, with the two head-plates, a disk arranged between the head-plates and provided with curved slots extending on each side of its axis, a yoke embracing the plates and disk, and a clamping device passing through the yoke-plates and disk, of a handle connected with the yoke and provided with an axial bore, a forked spring having its stem longitudinally displaceable within the bore with its prongs lying in the curved slots, and lugs extending in opposite directions from the extremity of each prong into engagement one with each of the head-plates.

5. In a mathematical instrument, the combination, with the two head-plates, a disk arranged between the head-plates, and provided with curved slots extending on each side of its axis with an interposed spur extending radially from the axis, a yoke embracing the head-plates and disk, a threaded bolt passing through the yoke, head-plates and disk and provided with a conical shoulder forming a pivot bearing upon one of the head-plates, a second conical pivot embracing the bolt and bearing against the other head-plate, pins securing the pivots against rotation, and a lock-nut on the threaded end of the bolt, of a handle connected with the yoke and provided with an axial bore, a forked spring-piece having its stem longitudinally displaceable in the bore with its prongs lying in the slots on each side of the spur, and lugs extending laterally in opposite directions one from the extremity of each prong and engaging with one of the head-plates.

In testimony whereof I affix my signature to this specification in the presence of two witnesses.

HEINRICH KERN.

Witnesses:
F. RUETSCHIA NUSPERLI,
ALFRED KOBELT.